United States Patent
Li et al.

(10) Patent No.: US 10,090,758 B1
(45) Date of Patent: Oct. 2, 2018

(54) SPLIT RESERVOIR CAPACITOR ARCHITECTURE FOR A CHARGE PUMP

(71) Applicant: SYNAPTICS INCORPORATED, San Jose, CA (US)

(72) Inventors: Zheming Li, San Jose, CA (US); Chunbo Liu, San Jose, CA (US); Steve Chikin Lo, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/683,390

(22) Filed: Aug. 22, 2017

(51) Int. Cl.
*H02M 3/07* (2006.01)

(52) U.S. Cl.
CPC ..................... *H02M 3/07* (2013.01)

(58) Field of Classification Search
CPC ........................................ H02M 3/07
USPC ............................................ 327/536
See application file for complete search history.

(56) References Cited

U.S. PATENT DOCUMENTS

| | | | | |
|---|---|---|---|---|
| 5,592,063 A | * | 1/1997 | Savignac | G11C 5/145 320/166 |
| 6,320,770 B1 | * | 11/2001 | Feuser | G06F 1/26 307/85 |
| 8,975,953 B2 | * | 3/2015 | Meehan | H03K 17/161 327/534 |

* cited by examiner

Primary Examiner — Jeffrey Zweizig
(74) Attorney, Agent, or Firm — Patterson + Sheridan, LLP

(57) ABSTRACT

Embodiments herein provide electronic devices that include a charge pump coupled to a split reservoir capacitor which includes at least two discrete capacitors. Further, the discrete capacitors are coupled together by a switch (e.g., a transistor) which is controlled by an output regulator. In one embodiment, the output regulator monitors an output voltage of the charge pump and the split reservoir capacitor to determine when the output differs from a predetermined target voltage. When the switch isolates the two capacitors, the charge pump can continue to add charge to a first one of the discrete capacitors. Thus, when the output regulator detects a dip in the output voltage and activates the switch to reconnect the two discrete capacitors, the first discrete capacitor has extra charge which can decrease the time needed to bring the output voltage back to the target voltage.

20 Claims, 8 Drawing Sheets

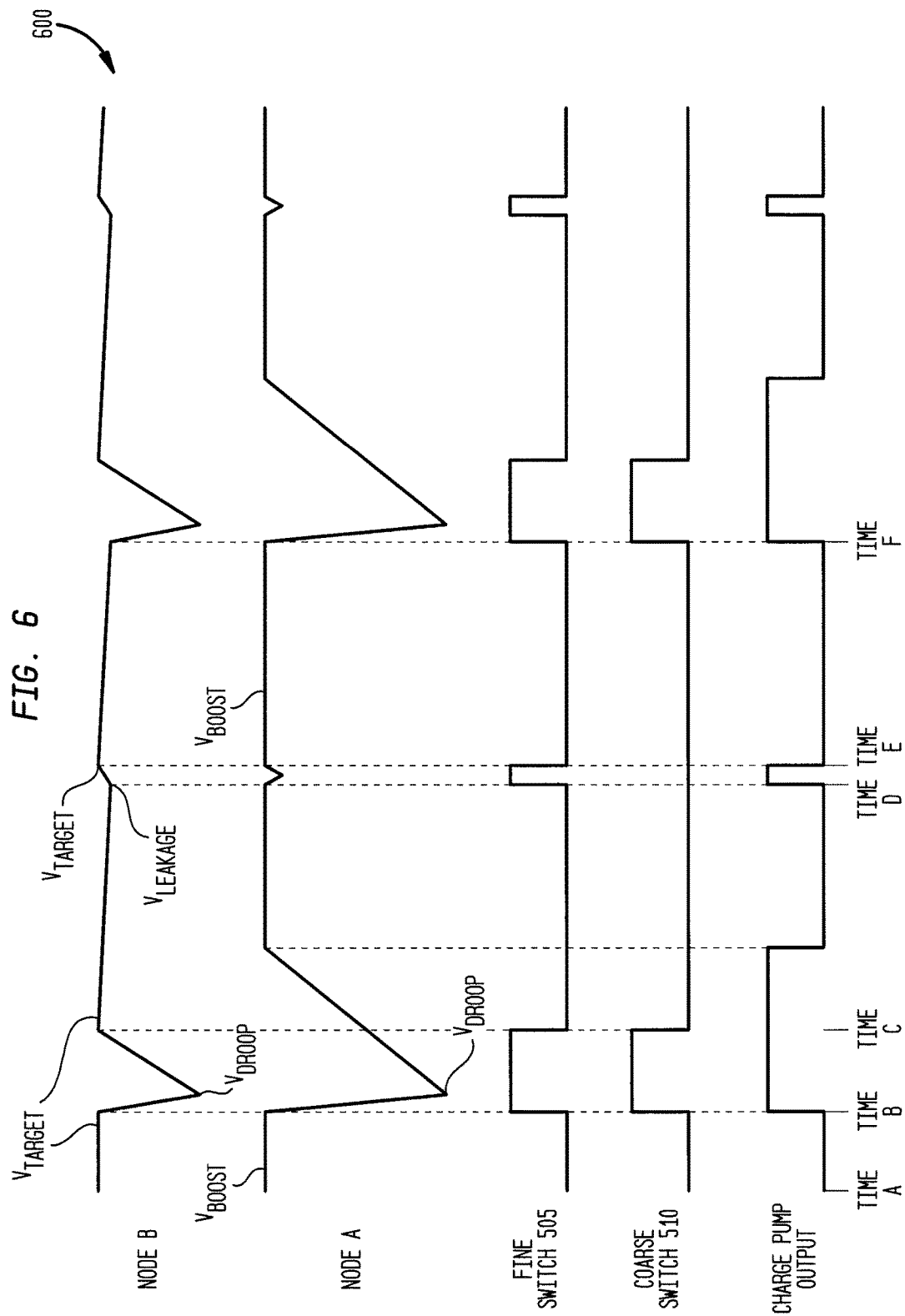

US 10,090,758 B1

SPLIT RESERVOIR CAPACITOR ARCHITECTURE FOR A CHARGE PUMP

FIELD OF THE INVENTION

Embodiments herein generally describe charge pumps coupled to a split reservoir capacitor architecture.

BACKGROUND OF THE INVENTION

Charge pumps can be coupled to a capacitor which serves as a charge reservoir for providing additional charge to a load. When a load is first coupled to the charge pump, both the charge pump and the capacitor transmit charge to the load which mitigates a voltage droop at the output of the charge pump. When disconnected from the load, the charge pump can replenish the charge in the capacitor such that the next time the charge pump is coupled to the load, the reservoir capacitor can provide additional charge thereby mitigating the voltage droop.

BRIEF SUMMARY OF THE INVENTION

One embodiment described herein is a circuit that includes a charge pump, a first capacitor coupled at a first end to an output of the charge pump, a first switch coupled at a first end to the output of the charge pump and to the first end of the first capacitor, a second capacitor coupled at a first end to a second end of the first switch, and an output regulator coupled to the first end of the second capacitor where the output regulator is configured to change a state of the first switch in response to a change in voltage at the first end of the second capacitor.

Another embodiment described herein is an integrated circuit that includes a charge pump, a first capacitor coupled at a first end to an output of the charge pump, a first switch coupled at a first end to the output of the charge pump and to the first end of the first capacitor, a second capacitor coupled at a first end to a second end of the first switch, and an output regulator coupled to the first end of the second capacitor where the output regulator is configured to change a state of the first switch in response to a change in voltage at the first end of the second capacitor.

Another embodiment described herein is an electronic device that includes a display screen which includes a plurality of pixels and a plurality of gates lines where each of the plurality of gate lines is coupled to a respective row of the plurality of pixels. The electronic device also includes a charge pump, a first capacitor coupled at a first end to an output of the charge pump, a first switch coupled at a first end to the output of the charge pump and to the first end of the first capacitor, a second capacitor coupled at a first end to a second end of the first switch where the display screen is configured to selectively couple the first end of the second capacitor to a respective one of the plurality of gate lines, and an output regulator coupled to the first end of the second capacitor where the output regulator is configured to change a state of the first switch in response to a change in voltage at the first end of the second capacitor.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a timing chart illustrating the operation of the circuit shown in FIG. 5 in accordance with an embodiment described herein.

Figure 1:
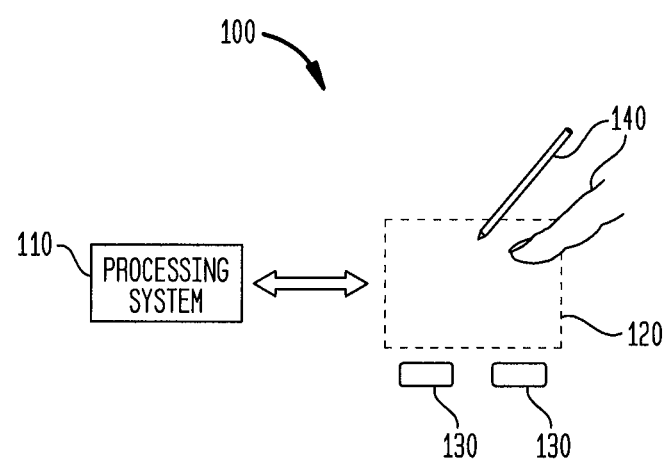
FIG. 1 is a block diagram of an exemplary system that includes an input device in accordance with an embodiment of this disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide electronic devices and methods that facilitate improved usability. In one embodiment, the electronic devices include a charge pump coupled to a split reservoir capacitor which includes at least two discrete capacitors. Further, the discrete capacitors are coupled together by a switch (e.g., a transistor) which is controlled by an output regulator. In one embodiment, the output regulator monitors an output voltage of the charge pump and the split reservoir capacitor to determine when the output differs from a fixed target voltage. If the output voltage is sufficiently close to the target voltage, the output regulator opens the switch thereby electrically isolating the two discrete capacitors in the reservoir capacitor. When isolated, the charge pump can continue to add charge to a first one of the discrete capacitors. Thus, when the output regulator detects a dip in the output voltage and activates the switch to reconnect the two discrete capacitors, the first discrete capacitors has extra charge which can decrease the time needed to bring the output voltage back to the target voltage.

In one embodiment, the capacitor reservoir capacitor includes two parallel switches which selectively couple the first discrete capacitor to the second discrete capacitor. Moreover, the two switches may be different. For example, the reservoir capacitor may include a coarse switch which has a lower associated resistance which permits a much larger current flow than a fine switch which has a higher associated resistance. The output regulator may control the fine switch such that when small deviations from the target voltage are detected only the fine switch is activated. Because of the internal resistance of the fine switch, a limited amount of charge flows from the first discrete capacitor to the output which prevents the output voltage from spiking. In contrast, during larger voltage dips at the output voltage, the coarse switch is activated which permits higher currents (and more charge) to flow from the first discrete capacitor to the output.

Turning now to the figures, FIG. 1 is a block diagram of an exemplary input device 100, in accordance with embodiments described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include $I^2C$, SPI, PS/2, Universal Serial Bus (USB), Bluetooth®, RF, and IrDA protocols.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 may comprise one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or a pair of coils. Some combination of the magnitude, phase, and frequency of the currents may then be used to determine positional information.

In some capacitive implementations of the input device 100, voltage or current is applied to create an electric field. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object 140. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object 140 near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may transmit transmitter signals that are modulated relative to a reference voltage (e.g., system ground). Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes). Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators/mechanisms (not shown), etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments described herein are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
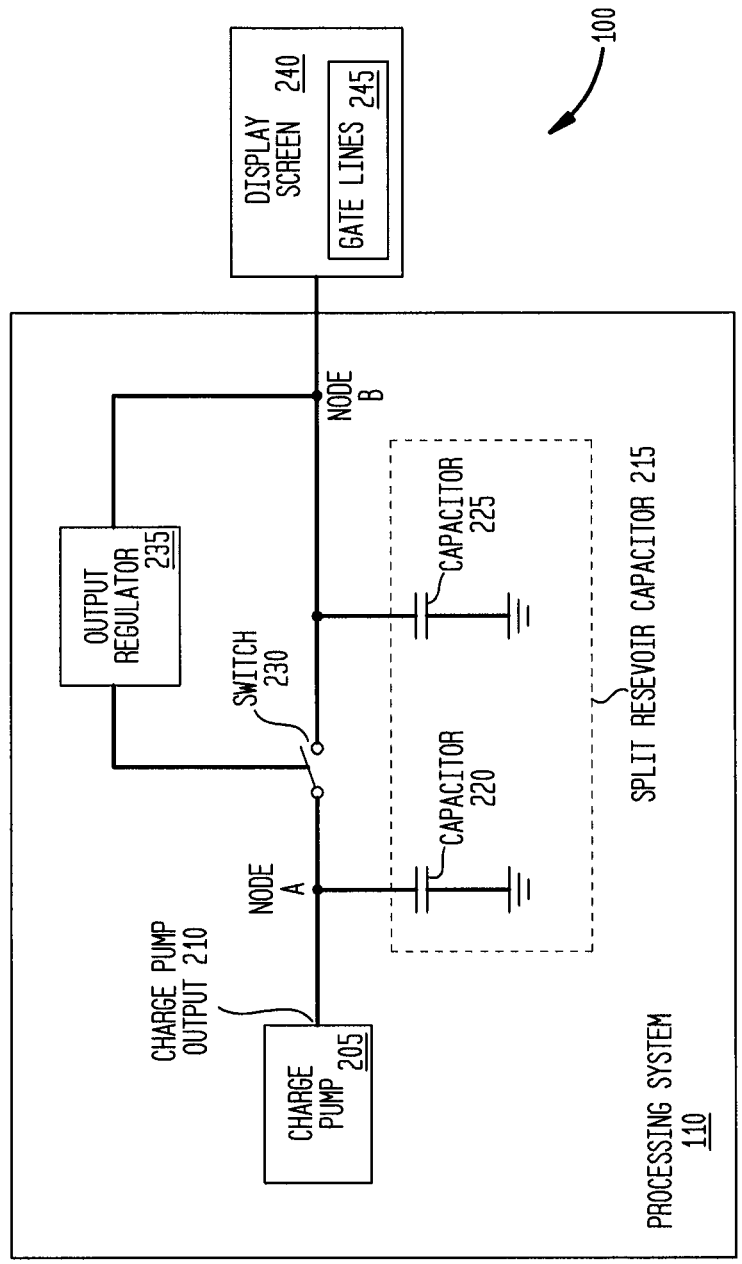
FIG. 2 illustrates a charge pump coupled to a split reservoir capacitor, in accordance with an embodiment described herein.

FIG. 2 illustrates a charge pump 205 coupled to a split reservoir capacitor 215, in accordance with an embodiment described herein. As shown, the split reservoir capacitor 215 includes a first discrete capacitor 220 and a second discrete capacitor 225 which are selectively coupled at one end by a switch 230. An output regulator 235 is coupled to Node B and controls the operational state of the switch 230 in response to the voltage at Node B. In one embodiment, the output regulator 235 compares the voltage at Node B to a target voltage ($V_{TARGET}$). If the target deviates from the target voltage without a predefined amount (e.g., 100 mV), the output regulator 235 closes the switch 230 thereby electrically coupling Node B to Node A. However, if the voltage at Node B is sufficiently close to the target voltage (e.g., within 100 mV), the output regulator 235 opens the switch thereby disconnecting the charge pump 205 and the capacitor 220 from Node B.

In one embodiment, the capacitance value of the capacitors 220 and 225 are the same. In another embodiment, the capacitance values of the capacitors 220 and 225 are different. For example, if the capacitor 220 has a different capacitance value than the capacitor 225, the total space in the processing system 110 may be smaller than if the capacitors 220 and 225 were the same capacitance value.

In FIG. 2, the charge pump 205 and split reservoir capacitor 215 operate to drive a voltage onto a load—e.g., gate lines 245 in this example. As shown, the gate lines 245 are integrated into a display screen 240 of the input device 100. In one embodiment, the display screen 240 uses the gate lines 245 to activate a row of pixels in the display screen 240 so that the color of those pixels can be updated or refreshed. For example, the display screen 240 may include gate selection logic which couples a respective one of the gate lines 245 to Node B so that the charge pump and the split reservoir capacitor 215 can drive a voltage on the connected gate line 245 in order to activate a corresponding row of pixels. In this manner, the display screen 240 can raster through the gate lines 245 in order to update an image being display on the screen 240.

Although the charge pump 205 and the split reservoir capacitor 215 are coupled to the gate lines 245 in a display screen in FIG. 1, these components can be coupled to any load. For example, the charge pump 205 and the split reservoir capacitor 215 can be coupled to a dynamic load whose changes create voltage dips at the output—i.e., at Node B. The capacitors 220 and 225 can mitigate the dips in the output voltage at Node B which may improve the operability of the device 100. For example, larges changes in the voltage at Node B may result in the input device 100 behaving erroneously. For example, if a ripple (e.g., the fluctuation of the voltage) at Node B is large, the ripple can cause logic coupled to Node B to switch to an unintended state. For example, if the voltage at Node B falls below or rises above a threshold, the logic coupled to Node B may behave in an unexpected manner. Thus, minimizing the ripple in the output voltage of the charge pump can improve the reliability of the input device 100.

In one embodiment, the ripple at Node B can be reduced by increasing the capacitance at the output 210 of the charge pump 205. However, using a large capacitor may mean the capacitor cannot be integrated into the processing system 110. As such, the capacitor may be external to processing system such as mounted on a separate substrate (e.g., a printed circuit board). Put differently, integrating a large capacitor into an integrated circuit may require too much area in the integrated circuit as well as have negative effects on other circuitry in the chip. However, in one embodiment, the value of the capacitors 220 and 225 in the split reservoir capacitor 215 may be small enough (e.g., less than a micro-Farad) such that these capacitors 220 and 225 can fabricated within the processing system 110—e.g., the same integrated circuit. Thus, the charge pump 205, split reservoir capacitor 215, and the output regulator 235 can be disposed in the same integrated circuit or chip. Advantageously, the system designer does not need to find additional space in the input device 100 to mount the capacitors 220 and 225. That is, the charging system illustrated in FIG. 2 provides a one-chip solution for driving a load.

Figure 3:
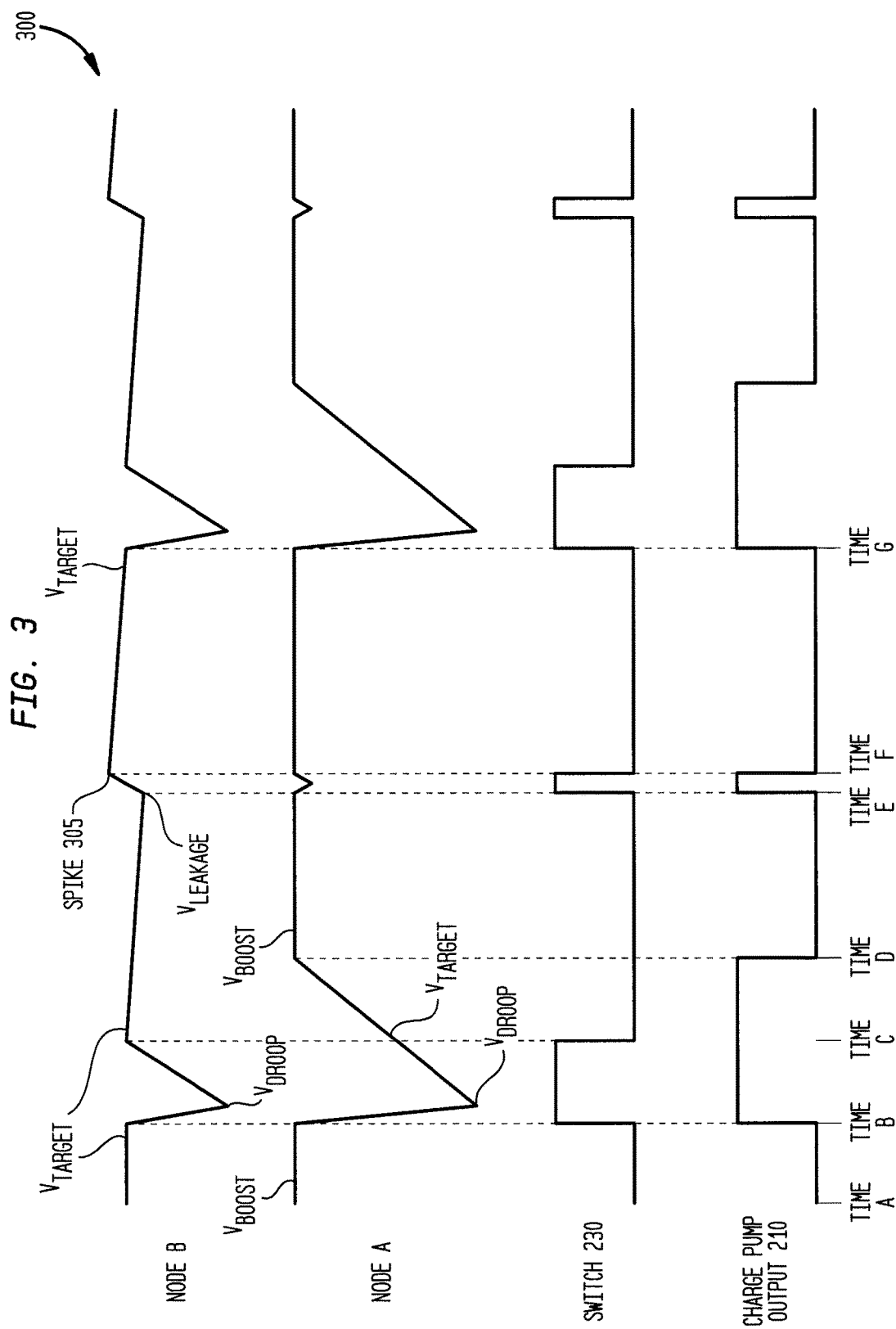
FIG. 3 is a timing chart illustrating the operation of the circuit shown in FIG. 2 in accordance with an embodiment described herein.

FIG. 3 is a timing chart 300 illustrating the operation of the charging system shown in FIG. 2 in accordance with an embodiment described herein. At Time A, it is assumed the processing system 110 is finishing a display line update period where the pixels in a row of the display screen 240 are updated. In this example, Node B is coupled to one of the gate lines 245 which activates corresponding transistors that permit the source lines (not shown) to update the voltages on the pixels in the row. In one embodiment, the display screen 240 is an LCD screen but can also be a LED screen, OLED screen, and the like.

At Time A, the voltage at the Node B is at a target voltage $V_{TARGET}$ (although the voltage may have drooped some due to leakage as described below). In this embodiment, the target voltage $V_{TARGET}$ is the desired gate voltage used to activate the pixels coupled to the gate line. The target voltage $V_{TARGET}$ ensures that the transistors coupling the pixels to the source lines are closed so that the voltages of the pixels can be updated.

The voltage at Node A, however, is different from the voltage at Node B. For these nodes to be at different voltages, the switch 230 is open (as shown by the low voltage signal in chart 300) which electrically isolates Node B and the capacitor 225 from Node A, the charge pump 205, and the capacitor 220. In this embodiment, Node A is driven to a boost voltage $V_{BOOST}$ which is greater in magnitude than the target voltage $V_{TARGET}$. Thus, assuming the capacitance values of the capacitors 220 and 225 are the same, the capacitor 220 (which is coupled to Node A) stores more charge than the capacitor 225 since charge (Q) of a capacitor is determined by the capacitance (C) of the capacitor and the voltage (V) across the capacitor, i.e., Q=C*V.

Figure 4A:
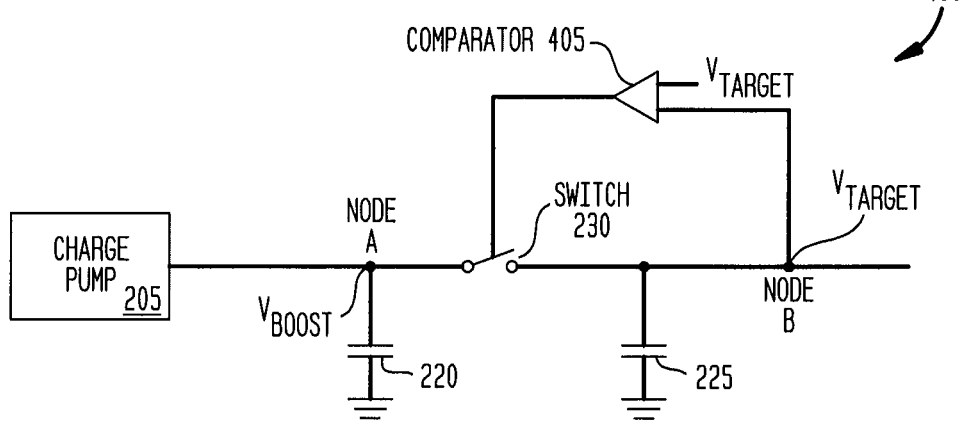
FIGS. 4A-4E illustrate different states of the circuit shown in FIG. 2 according to the timing chart in FIG. 3 in accordance with embodiments described herein.

FIG. 4A illustrates the operational state of the charge system 400 at Time A of FIG. 3. The charge system 400 includes a comparator 405 which is used as the output regulator 235 although other types of regulators can be used. The comparator 405 has a first input coupled to Node B while a second input is coupled to a fixed reference voltage—e.g., the target voltage $V_{TARGET}$ or the desired gate line voltage in this example. An output of the comparator 405 is a control signal which controls the operational state of the switch 230. For example, the output of the comparator 405 may be connected to a gate of a transistor which activates and deactivates (e.g., opens and closes) the transistor in order to selectively couple Node A to Node B.

In one embodiment, the comparator 405 compares the voltages at the first and second inputs, and so long as these voltages are sufficiently close (e.g., within a predefined threshold), opens the switch 230 such that Node A is electrically isolated from Node B. At Time A, the voltage at Node B is at (or sufficiently close to) the target voltage $V_{TARGET}$, and thus, the switch 230 is open. While the switch 230 is open, the charge pump 205 can drive the voltage at Node A to a different value that the voltage at Node B. In one embodiment, the voltage at Node A is higher than the voltage at Node B. For example, the target voltage $V_{TARGET}$ may be 20 V while the boost voltage $V_{BOOST}$ is 26 V. As such, the capacitor 220 stores more charge than if the voltage at Node A was at the target voltage $V_{TARGET}$. Because of the capacitors 220 and 225 can be "split" or electrically isolated from each other using the switch 230, the values of the capacitors 220 and 225 can be smaller since the capacitor 220 can be charged to a higher voltage—i.e., the boost voltage $V_{BOOST}$—relative to a charge pump whose output is coupled to only one capacitor.

Returning to FIG. 3, at Time B, the charging system shown in FIG. 2 is coupled to a different gate line 245. That is, the input device 100 begins to update a different row of pixels in a subsequent display line update period. As such, the display screen 240 couples Node B to a different gate line 245 in order to increase the voltage on the gate line 245 and couple the corresponding pixels in the row to the source lines. As a result of coupling Node B to a different gate line 245, the voltage at Node B droops as the charge stored by the capacitor 225 is depleted in order to increase the voltage on the gate line 245.

Once the voltage at Node B begins to droop, the output regulator 235 detects the voltage droop and activates the switch 230 at Time B (or soon thereafter) in order to couple the capacitor 220 and the charge pump 205 to Node B, and thus, to the load—i.e., the gate line 245. As such, the charge pump 205, the capacitor 220 and the capacitor 225 provide charge to counteract the droop in the voltage at Nodes A and B. Eventually, after Time B, the voltage at the Nodes A and B stops falling and begins to rise. The time required before the voltage reaches the lowest point—i.e., $V_{DROOP}$—depends on the combined charge on the capacitors 220 and 225 and the amount of charge outputted by the charge pump 205.

Figure 4B:
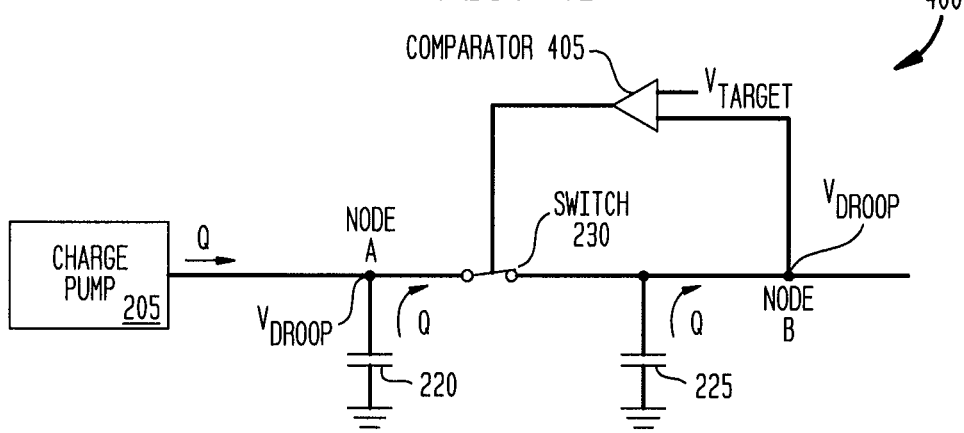

FIG. 4B illustrates the operational state of the charge system 400 after Time B when the voltage of Nodes A and B has reached the droop voltage. As shown, the switch 230 is closed. That is, the comparator 405 determines that the voltage at Node B is different from the target voltage $V_{TARGET}$, and as such, closes the switch 230. As a result, the charge pump 205 and the capacitor 220 are coupled to Node B and begin to, along with the capacitor 225, provide charge to the load in order to raise the voltage at Node B and Node A.

As described above, because the capacitor 220 was charged to a higher voltage (i.e., $V_{BOOST}$) than the target voltage $V_{TARGET}$, the capacitor 220 has more charge which can be used to mitigate $V_{DROOP}$ than if this capacitor 220 was charged to the target voltage (or if the capacitor 220 was omitted and only one capacitor was used). As a result, the voltage difference between the target voltage $V_{TARGET}$ and the droop voltage $V_{DROOP}$ is minimized. For instance, the voltage difference between the target voltage $V_{TARGET}$ and the droop voltage $V_{DROOP}$ may be only one volt rather than two volts. Thus, the ripple in the voltage at Node B (i.e., the fluctuation of the voltage) is reduced which may improve the performance of the electronic device.

Returning to FIG. 3, at Time C, the voltage at Node A and Node B has reached the target voltage. Stated differently, the charge system has successfully charged the gate line 245 to the desired gate voltage. In addition, the output regulator determines that the voltage at Node B has reached (or is sufficiently close) to the target voltage $V_{TARGET}$, and in response, opens the switch 230. Doing so isolates Node B from Node A. However, in this embodiment, the charge pump 205 does not turn off. Instead, the charge pump 205 continues to provide charge which increases the voltage at Node A while the voltage at Node B remains at the target voltage $V_{TARGET}$.

Figure 4C:
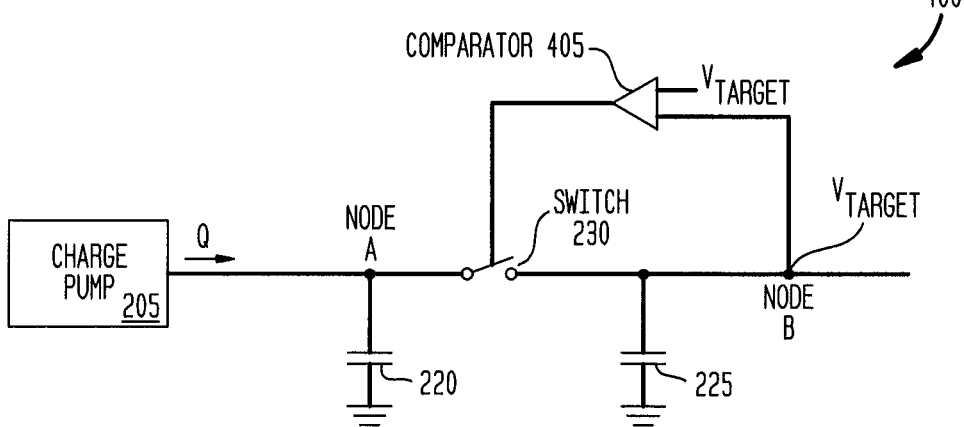

FIG. 4C illustrates the operational state of the charge system 400 at Time C of FIG. 3. As shown, the comparator 405 opens the switch 230 because the voltage at Node B is at the target voltage $V_{TARGET}$. The charge pump 205, continues to provide charge (i.e., drives a current) which increases the voltage at Node A. As such, the voltage at Node A begins to increase above the target voltage $V_{TARGET}$ while the voltage at Node B remains substantially constant (although the voltage may begin to droop due to leakage current as described below).

Returning to FIG. 3, at Time D, the charge pump is deactivated when the voltage at Node A reaches the boost voltage $V_{BOOST}$ such that the charge pump no longer outputs charge. In one embodiment, the charge pump 205 may be controlled by timing signals. That is, the processing system could be tested during a tuning operation to determine the length of time required before the charge pump 205 raises the voltage at Node A to the desired boost voltage $V_{BOOST}$. Put differently, a system designer can determine the length of time between Time C when the switch isolates Node A from Node B and Time D when the voltage at Node A reaches the boost voltage $V_{BOOST}$. Once this time period is determined, the charge pump can be controlled using digital signals to shut off its output 210 once Time D is reached—i.e., when Node A reaches the boost voltage $V_{BOOST}$. However, in another embodiment, the charge system can include a second output regulator coupled to the Node A which determines when the voltage at Node A reaches the desired boost voltage $V_{BOOST}$. In response, the second output regulator outputs a control signal which deactivates the charge pump 205.

Figure 4D:
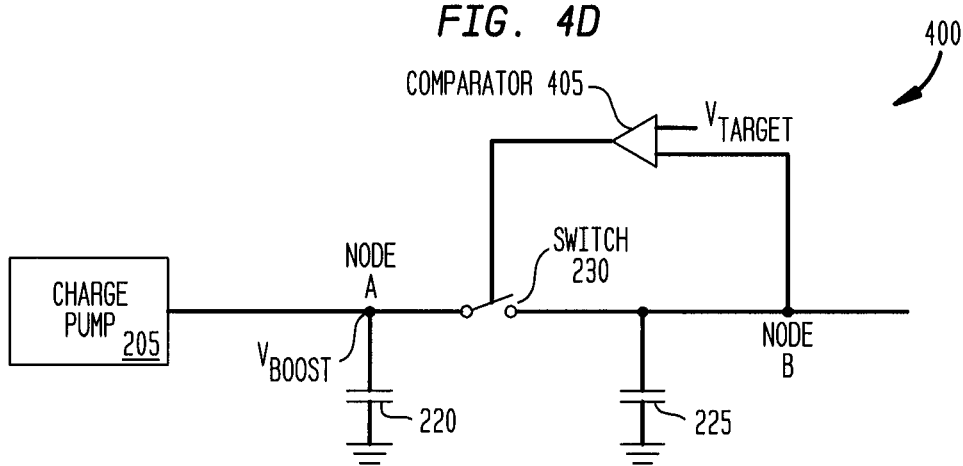

FIG. 4D illustrates the operational state of the charge system 400 at Time D of FIG. 3. As shown, the switch 230 is still open which isolates Node B from Node A. Further, the charge pump 205 has stopped providing charge to the capacitor 220 since the capacitor has now been charged to the boost voltage $V_{BOOST}$.

Moreover, the voltage at Node B may no longer be at the target voltage $V_{TARGET}$. As mentioned above, there may be a leakage current that reduces the charge stored on the capacitor 225 thereby reducing the voltage at Node B. In one embodiment, the leakage current is due to leakage currents in the display screen 240 such as the transistors coupled to the gate line 245. Although small, overtime the leakage currents can cause the voltage of the gate line 245 and Node B to droop. However, at Time D, the voltage at Node D is still sufficiently close to the target voltage $V_{TARGET}$ (e.g., within 100 mV of the target voltage $V_{TARGET}$) such that the comparator 405 has not closed the switch 230.

Returning to FIG. 3, at Time E, the voltage at Node B has fallen to below the target voltage $V_{TARGET}$ such that the output regulator closes the switch 230. As shown, the voltage on Node B slowly decreases from Time C to Time E until the voltage has fallen outside the predetermined threshold permitted by the output regulator coupled to Node B. In the chart 300, the voltage on the Node A has fallen to $V_{LEAKAGE}$ which has a magnitude that is less than the magnitude of the target voltage $V_{TARGET}$.

Once the switch 230 activates, Node A is electrically coupled to Node B. As a result, the charge stored in the capacitor 220 can flow into Node B and into the load—e.g., the gate line 245—in order to raise the voltage on Node B back to the target voltage $V_{TARGET}$. Moreover, the charge pump 205 also turns on to provide charge to Node B. However, in another embodiment, the charge pump 205 may remain deactivated and only the charge stored on the capacitor 220 is used to drive the voltage on Node B back to the target voltage $V_{TARGET}$.

In FIG. 3, once the switch 230 closes, the charge provided by the capacitor 220 and the charge pump 205 cause the voltage at Node B to increase from $V_{LEAKAGE}$ to a higher magnitude voltage between Times E and F. However, because the output regulator 235 may have some delay, the voltage on Node B can increase past the target voltage $V_{TARGET}$ as shown by the voltage spike 305. That is, once closed, the low resistance of the switch 230 permits more charge than needed to flow from Node A to Node B which raises the voltage at Node B past the target voltage $V_{TARGET}$. As such, closing the switch 230 in order to compensate for leakage currents in the load can cause a ripple in the voltage at Node B. Although this ripple is typically less extreme than the ripple at Time B at the beginning of a new display line update period, the ripple is still undesirable. Later embodiments discuss a different switch scheme in order to reduce the ripple between Times E and F.

Between Time E and F, the voltage at Node A also falls as the charge on the capacitor 220 is used to increase the voltage at Node B. However, in this embodiment, the switch 230 is opened before the voltage at Node A can fall to the same value as Node B. That is, the voltage at Node A may remain significantly higher (e.g., more than a volt) than the voltage at Node B. Because the charge pump 205 is active, the charge provided by its output 210 between the Time E and F can raise the voltage on Node A back to the boost voltage $V_{BOOST}$.

Figure 4E:
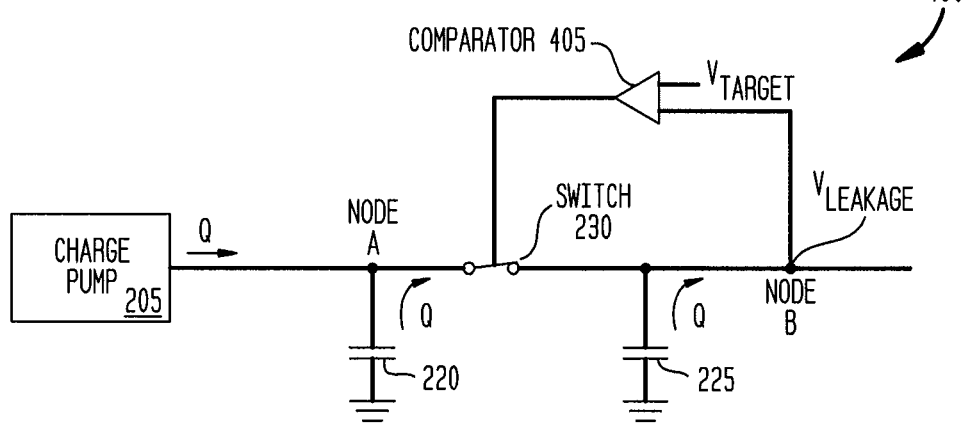

FIG. 4E illustrates the operational state of the charge system 400 at Time E of FIG. 3. Because the voltage at Node B has fallen to $V_{LEAKAGE}$ which is no longer sufficiently close to the target voltage $V_{TARGET}$, the comparator 405 closes the switch 230 which connects Node B to Node A. As a result, the charge stored on the capacitor 220 begins to flow to Node B which raises the voltage at Node B (and decreases the voltage at Node A). In parallel, the charge pump 205 is active and provides additional charge to Node B.

Returning to FIG. 3, at Time F, the output regulator opens the switch 230 which isolates Node A from Node B. Although the voltage at Node B has risen above the target voltage $V_{TARGET}$ as illustrated by the spike 305, the leakage current causes the voltage at Node B to fall slowly until the voltage again reaches the target voltage $V_{TARGET}$. However, before the voltage at Node B falls too far below the target voltage $V_{TARGET}$, at Time G, the display screen 240 begins a new display line update period where a new gate line 245 is coupled to Node B which causes the voltage at Node B to drop. The process described in Times B-F and in FIGS. 4A-4E then repeats.

Although the chart 300 illustrates that the switch 230 needs to turn on twice during a display line update, the leakage current may cause the switch to activate multiple times. Put differently, the output regulator 235 may detect that the leakage current corresponding to the gate line has caused the voltage on Node B to fall too far below the target voltage $V_{TARGET}$ multiple times during a display line update period. On the other hand, the display screen 240 may have less leakage current such that during a display line update period the voltage on the Node B remains sufficiently close to the target voltage $V_{TARGET}$ so that the switch 230 is only closed when switching between gate lines 245 as shown at Times B and G.

Moreover, in other embodiments, the split reservoir capacitor 215 may include more than two discrete capacitors, e.g., three, four, five, etc. Adding more discrete capacitors to the split reservoir capacitor 215 can provide additional control over the amount of charge provided during the times illustrated in FIG. 3. For example, during times Time B and G when switching between gate lines, all of the discrete capacitors can be coupled to the load in order to mitigate the droop in the output voltage of the charging system. However, at Time E when compensating for a drop in the voltage due to leakage current, only a subset of the discrete capacitors in the split reservoir capacitor 215 are coupled to the output of the charging system. By not coupling all the discrete capacitors to the output of the charging system, the amount of charge transferred to the load is reduced which may mitigate the spike 305 shown in the chart 300 and reduce the voltage ripple at the output of the charging system.

In another embodiment, the capacitance values of the capacitors 220 and 225 in the split reservoir capacitor 215 are configurable. Put differently, the value of the capacitors 220 and 225 can be customized in response to the load attached to the charging system. For example, the processing system 110 may include digital control signals for setting the capacitance values of the capacitors in the split reservoir capacitor 215. Thus, the processing system 110 can be a one-chip solution that can drive different loads. For example, different display screen manufactures have different designs which means the load on the charging system can vary. If the capacitance values are configurable, the processing system can be tuned during assembly of the input device to satisfy the particular load. In this manner, the same design of the processing system 110 (e.g., an integrated circuit) which includes the split reservoir capacitor 215 with configurable discrete capacitors can be used with different loads. In another embodiment, the processing system 110 can dynamically change the capacitances of the split reservoir capacitor 215 during operation. For example, the load attached to the charge system may change overtime. In response, the processing system 110 can dynamically change the values of the capacitors 220 and 225 to better match the changing load.

Figure 5:
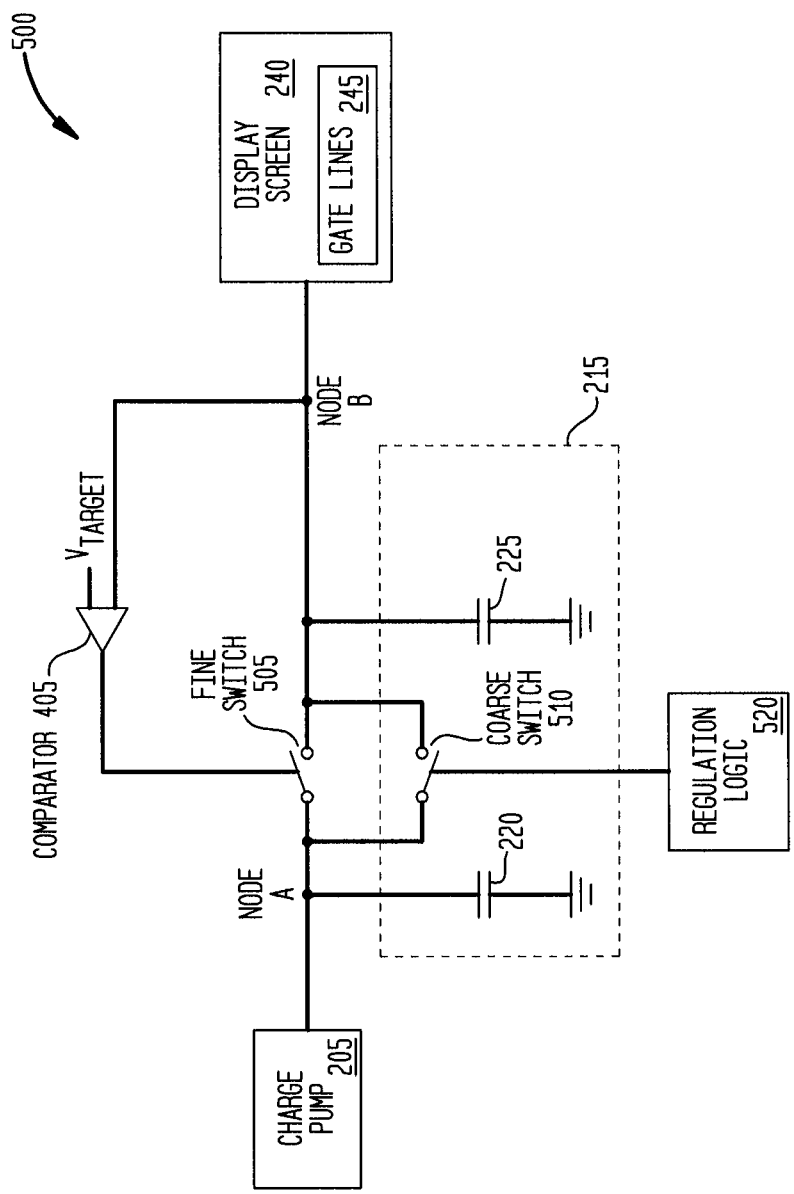
FIG. 5 illustrates a charge pump coupled to a split reservoir capacitor in accordance with an embodiment described herein.

FIG. 5 illustrates a charge system 500 that includes a charge pump 205 coupled to a split reservoir capacitor 215 in accordance with an embodiment described herein. The charge system 500 differs from the charge system illustrated in FIG. 2 in that Node A and Node B are selectively coupled using two switches rather than one. As shown, the charge system 500 includes a fine switch 505 and a coarse switch 510 coupled in parallel. As such, if either switch is closed, the Nodes A and B are electrically coupled such that charge can flow between the nodes.

In one embodiment, the amount of charge or current permitted to flow through the fine and coarse switches 505 and 510 is different. In this example, the fine switch 505 has a higher overall resistance than the coarse switch 510 such that, assuming the same amount of voltage difference across the switches, the fine switch 505 permits less charge or current to flow than the coarse switch 510. For example, a transistor forming the fine switch 505 may have a higher internal resistance than a transistor forming the coarse switch 510.

The charge system 500 includes regulation logic 520 for controlling the coarse switch 510. The fine switch 505, in contrast, is controlled by the comparator 405. As such, the fine switch 505 is closed and opened (i.e., activated and deactivated) in response to the voltage at Node B deviating from the target voltage $V_{TARGET}$. In one embodiment, the regulation logic 520 opens and closes the coarse switch 510 using predefined timing signals. For example, the regulation logic 520 may include digital logic which closes the coarse switch 510 whenever a new display update time period begins. When the voltage at the Nodes A and B reach the target voltage $V_{TARGET}$, the regulation logic 520 opens the coarse switch 510.

In another embodiment, the regulation logic 520 may be a comparator similar to comparator 405 which closes the coarse switch 510 when the voltage at Node B is too far from the target voltage $V_{TARGET}$ and opens the switch when the voltage at Node B is sufficiently close to the target voltage $V_{TARGET}$. However, the comparator in the regulation logic 520 may use a different threshold to determine when to open and close the coarse switch 510. For example, the comparator 405 may close the fine switch 505 whenever the voltage at Node B is more than 100 mV from the target voltage $V_{TARGET}$. In contrast, the comparator in the regulation logic 520 may close the coarse switch 510 whenever the voltage at Node B is more than 200 mV from the target voltage $V_{TARGET}$. Thus, when the charge system 500 is coupled to a different gate line 245 when starting a new display line update period, the comparator 405 closes the fine switch 505 when the voltage at Node B drops 100 mV from the target voltage $V_{TARGET}$ which is before the comparator in the regulation logic 520 closes the coarse switch 510 in response to the voltage at Node B dropping 200 mV. However, when the voltage at Node B droops because of leakage current during the display line update period, the comparator 405 closes the fine switch 505 but the comparator in the regulation logic 520 keeps the coarse switch 510 open (assuming the charge flowing through the fine switch 505 is sufficient to increase the voltage at Node B such that the voltage does not fall below 200 mV from the target voltage $V_{TARGET}$). In that scenario, only the fine switch 505 is closed in order to counteract the leakage current and raise the voltage at Node B back to the target voltage $V_{TARGET}$.

In one embodiment, the charging system 500 (except for the display screen 240) is disposed in the processing system 110 or in a single integrated circuit. Thus, the charging system 500 can provide a zero off-chip design where the capacitors 220 and 225 can be fabricated into an integrated circuit rather than being separate discrete components mounted to a substrate.

FIG. 6 is a timing chart 600 illustrating the operation of the circuit shown in FIG. 5 in accordance with an embodiment described herein. At Time A, it is assumed the charging system 500 is finishing a display line update period where the pixels in a row of the display screen 240 are updated. In this example, Node B is coupled to one of the gate lines 245 which activates corresponding transistors that permit the source lines (not shown) to update the voltages on the pixels in the row. At Time A, it is assumed Node B is at the target voltage $V_{TARGET}$ (although it may be slightly below this voltage due to the leakage current) and Node A is at the boost voltage $V_{BOOST}$.

Figure 7A:
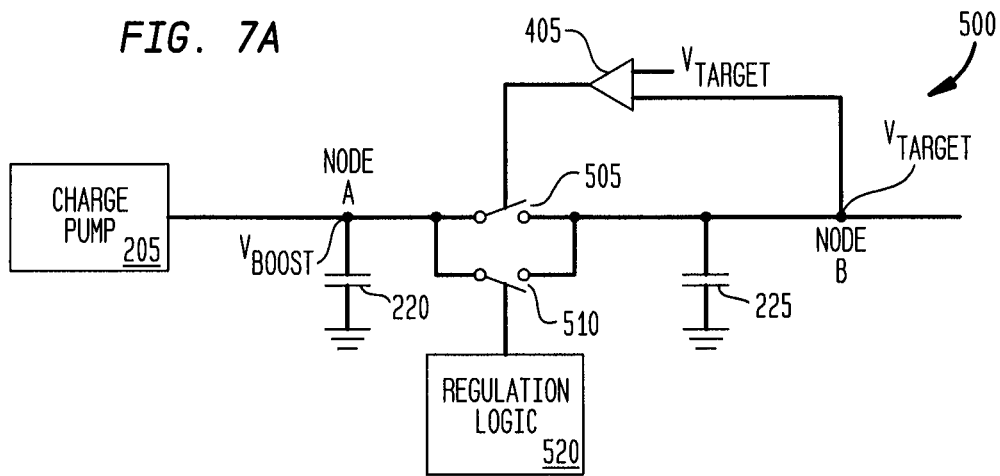
FIGS. 7A-7C illustrate different states of the circuit shown in FIG. 5 according to the timing chart in FIG. 6 in accordance with embodiments described herein.

FIG. 7A illustrates the operational state of the charge system 500 at Time A of FIG. 6. As shown, the fine switch 505 and the coarse switch 510 are open thereby electrically disconnecting Node B from Node A. As a result, charge is not flowing between the nodes. Further, Node B is charged to the target voltage $V_{TARGET}$ (or is sufficiently close to the target voltage such that the comparator 405 keeps the fine switch 505 open) while Node A is charged to the boost voltage $V_{BOOST}$. The charge pump 205 is deactivated such that the voltage at Node A does not change. As mentioned above, the charge pump 205 can be controlled by digital logic in response to timing signals in the processing system such as display line update periods. In another embodiment, the boost voltage $V_{BOOST}$ may be the maximum voltage of the charge pump 205 in which case the charge pump 205 may still be active but unable to increase the voltage at Node A.

Returning to FIG. 6, at Time B the charging system 500 shown in FIG. 5 is coupled to a different gate line 245. That is, the Node B is coupled to a different gate line 245 in the display screen 240 in order to activate a row of pixels in the screen 240 to perform display updating. As a result of coupling Node B to a different gate line 245, the voltage at Node B droops as the charge stored by the capacitor 225 is depleted in order to increase the voltage on the gate line 245.

Once the voltage at Node B begins to droop, the comparator 405 detects the voltage droop and activates the fine switch 505 at Time B (or soon thereafter) in order to couple the capacitor 220 and the charge pump 205 to Node B, and thus, to the load—i.e., the gate line 245. In addition, the regulation logic 520 also activates the coarse switch 510 which provides a parallel electrical connection between Node A and Node B. Thus, in this embodiment, both the fine and coarse switches 505 and 510 are closed. Because these switches 505 and 510 are coupled in parallel, the total resistance of the electrical paths between Node A and Node B is less than the individual resistances of the fine and coarse switches 505 and 510. Thus, activating both switches increases the amount of charge that can flow between the nodes relative to activating only one of the switches 505 and 510.

Figure 7B:
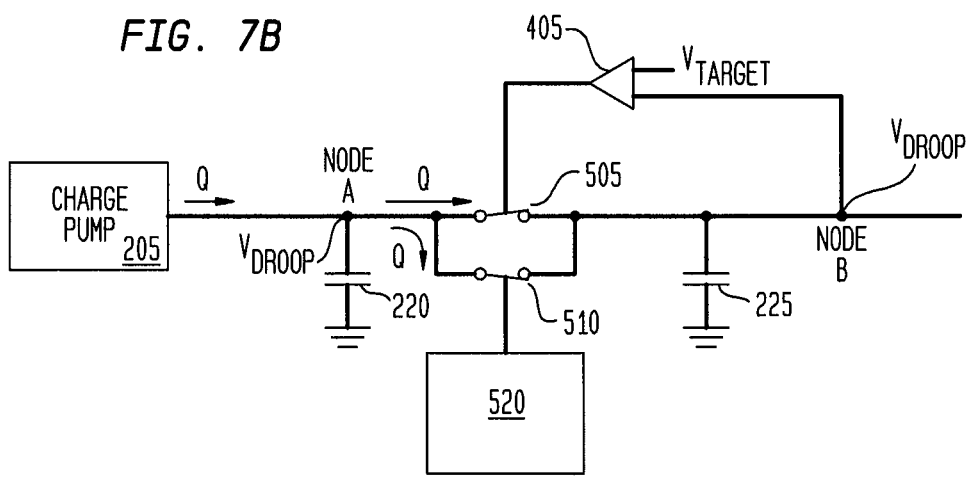

FIG. 7B illustrates the operational state of the charge system 500 after Time B of FIG. 6. Specifically, FIG. 7B illustrates the state of the charge system 500 when the voltage at Node B and Node A has reached $V_{DROOP}$. As shown, the charge pump 205 and the capacitor 220 provide charge which flows to Node B via the fine switch 505 and the coarse switch 510. Eventually, after Time B, the voltage at the Nodes A and B stops falling and the voltage begins to rise. The time required before the voltage reaches the lowest point—i.e., $V_{DROOP}$—depends on the combined charge on the capacitors 220 and 225 and the amount of charge outputted by the charge pump 205.

Returning to FIG. 6, at Time C, the voltage at Node A and Node B have reached the target voltage $V_{TARGET}$. Stated differently, the charge system 500 has successfully charged the gate line 245 to the desired gate voltage. In addition, the comparator 405 determines that the voltage at Node B has reached (or is sufficiently close) to the target voltage $V_{TARGET}$, and in response, opens the fine switch 505. Moreover, the regulation logic 520 opens the coarse switch 510 in response to a timing signal or using a comparator. Doing so isolates Node B from Node A. However, in this embodiment, the charge pump 205 does not turn off. Instead, the charge pump 205 continues to provide charge which increases the voltage at Node A while the voltage at Node B remains at the target voltage $V_{TARGET}$. Sometime after Time C, the voltage at Node A reaches the boost voltage $V_{BOOST}$ and the charge pump 205 is deactivated. As mentioned above, the charge pump 205 may be controlled using digital timing signals or a comparator in order to turn off its outputs when the voltage at Node A reaches the boost voltage $V_{BOOST}$.

At Time D, the voltage at Node B has drooped due to, e.g., a leakage current such that the voltage is below the target voltage $V_{TARGET}$. In response to a predefined dip in voltage, the comparator 405 activates the fine switch 505 in order to electrically couple Node B to Node A. As a result, the charge stored in the capacitor 220 along with the charge provided by the charge pump 205 increases the voltage at Node B.

In chart 600, the voltage at Node A droops temporary as charge stored on the capacitor 220 is used to increase the voltage at Node B. Moreover, the charge pump 205 also turns on to provide charge to Node B. However, in another embodiment, the charge pump 205 may remain deactivated and only the charge stored on the capacitor 220 is used to drive the voltage on Node B back to the target voltage $V_{TARGET}$.

Unlike in the timing chart 300 in FIG. 3, here the voltage does not spike or increase beyond the target voltage $V_{TARGET}$. Because the fine switch 505 is closed but the coarse switch 510 (i.e., the switch with the least resistance) remains open, the charge flowing between Node A and Node B is limited. As such, when the fine switch 505 is closed, the amount of charge flowing between the nodes can be controlled such that the comparator 405 has sufficient time to open the switch before the voltage at Node B can increase past the target voltage $V_{TARGET}$. Thus, using the two switch charging system 500 can reduce the ripple of the voltage at Node B relative to using one switch as illustrated in FIG. 3.

Figure 7C:
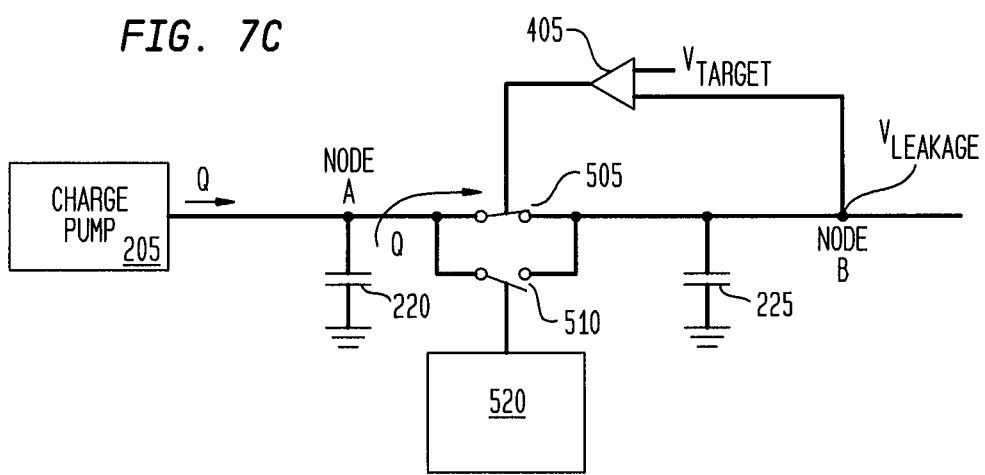

FIG. 7C illustrates the operational state of the charge system 500 after Time D of FIG. 6. Because the voltage at Node B has fallen to $V_{LEAKAGE}$ (which is less than a predetermined threshold from the target voltage $V_{TARGET}$), the comparator 405 closes the fine switch 505 which permits charge from the capacitors 220 and the charge pump 205 to flow to Node B. However, the charge or current can flow only through the fine switch 505. Because the charge system 500 can be designed such that the fine switch 505 permits less current flow than the coarse switch 510, the comparator 405 can stop too much charge from flowing from the capacitor 220 and charge pump into Node B which can prevent (or at least mitigate) the voltage spike 305 shown in timing chart 300.

Returning to FIG. 6, at Time E the comparator 405 deactivates the fine switch 505 again electrically isolating Node B from Node A. In the meantime, the charge pump 205 has replaced the charge in the capacitor 220 such that the voltage at Node A returns to the boost voltage $V_{BOOST}$, although in other embodiments, the charge pump 205 may have to remain active after Time E in order to increase the voltage at Node A to the boost voltage $V_{BOOST}$.

At Time F, the display screen 240 begins a new display line update period where a new gate line 245 is coupled to Node B which causes the voltage at Node B to drop. The process described in Times B-E and in FIGS. 7A-7C then repeats.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A circuit, comprising:
   a charge pump;
   a first capacitor coupled at a first end to an output of the charge pump;
   a first switch coupled at a first end to the output of the charge pump and to the first end of the first capacitor;
   a second capacitor coupled at a first end to a second end of the first switch; and
   an output regulator coupled to the first end of the second capacitor, wherein the output regulator is configured to change a state of the first switch in response to a change in voltage at the first end of the second capacitor.

2. The circuit of claim 1, wherein the output regulator comprises:
   a comparator configured to compare the voltage at the first end of the second capacitor to a predefined target voltage and change the state of the first switch when the voltage at the first end of the second capacitor changes relative to the predefined target voltage by a predetermined amount.

3. The circuit of claim 1, wherein a second end of the first capacitor and a second end of the second capacitor are both coupled to a reference voltage.

4. The circuit of claim 1, wherein capacitance values of the first and second capacitors are the same.

5. The circuit of claim 1, wherein capacitance values of the first and second capacitors are different.

6. The circuit of claim 1, wherein a capacitance value of at least one of the first and second capacitors is adjustable.

7. The circuit of claim 1, further comprising:
a second switch coupled in parallel with the first switch, wherein the first switch has a different internal resistance than the second switch.

8. The circuit of claim 7, further comprising:
regulation logic configured to change an operational state of the second switch in response to digital timing signals, wherein the second switch has a lower internal resistance than the first switch.

9. The circuit of claim 1, wherein the charge pump, the first capacitor, the first switch, the second capacitor, and the output regulator are embodied in an integrated circuit.

10. A method of operating a circuit, the method comprising:
generating charge at an output of a charge pump, wherein the output of the charge pump is coupled to a first end of a first capacitor and to a first end of a first switch, and wherein a first end of a second capacitor is coupled to a second end of the first switch; and
setting a state of the first switch based on a measured voltage at the first end of the second capacitor.

11. The method of claim 10, wherein setting the state of the first switch comprises:
comparing the measured voltage to a predefined target voltage; and
closing the first switch when the measured voltage is different from the predefined target voltage by a predetermined amount.

12. The method of claim 11, wherein, after closing the first switch, the method further comprises:
determining the measured voltage differs from the predefined target voltage by less than or equal to the predetermined amount, and in response, opening the first switch; and
charging, after opening the first switch, the first capacitor using the charge pump until a desired target voltage is reached at the first end of the first capacitor.

13. The method of claim 10, wherein a second end of the first capacitor and a second end of the second capacitor are both coupled to a reference voltage.

14. The method of claim 10, further comprising:
setting a state of a second switch in parallel with the first switch in response to digital timing signals, wherein the second switch has a different internal resistance than the first switch.

15. A electronic device, comprising:
a display screen comprising:
a plurality of pixels; and
a plurality of gates lines, wherein each of the plurality of gate lines is coupled to a respective row of the plurality of pixels;
a charge pump;
a first capacitor coupled at a first end to an output of the charge pump;
a first switch coupled at a first end to the output of the charge pump and to the first end of the first capacitor;
a second capacitor coupled at a first end to a second end of the first switch, wherein the display screen is configured to selectively couple the first end of the second capacitor to a respective one of the plurality of gate lines; and
an output regulator coupled to the first end of the second capacitor, wherein the output regulator is configured to change a state of the first switch in response to a change in voltage at the first end of the second capacitor.

16. The electronic device of claim 15, wherein the display screen is configured to couple the first end of the second capacitor to a different one of the plurality of gate lines in response to starting a new display line update period.

17. The electronic device of claim 16, wherein the output regulator comprises:
a comparator configured to compare the voltage at the first end of the second capacitor to a predefined target voltage and change the state of the first switch when the voltage at the first end of the second capacitor changes relative to the predefined target voltage by a predetermined amount, wherein the first switch is closed at a beginning of the new display line update period.

18. The electronic device of claim 15, further comprising:
a second switch coupled in parallel with the first switch, wherein the first switch has a different internal resistance than the second switch.

19. The electronic device of claim 18, further comprising:
regulation logic configured to change an operational state of the second switch in response to digital timing signals indicating a start of a new display line update period.

20. The electronic device of claim 15, wherein capacitance values of the first and second capacitors are the same.

* * * * *